United States Patent [19]

Oshizawa et al.

[11] Patent Number: 5,898,390
[45] Date of Patent: Apr. 27, 1999

[54] METHOD AND APPARATUS FOR CALIBRATION OF A DISTANCE SENSOR IN A VEHICLE NAVIGATION SYSTEM

[75] Inventors: Hidekazu Oshizawa; Toshikazu Sakakibara, both of Cupertino, Calif.

[73] Assignee: Zexel Corporation, Tokyo, Japan

[21] Appl. No.: 08/528,075

[22] Filed: Sep. 14, 1995

[51] Int. Cl.$^6$ .................................................. G08G 1/123
[52] U.S. Cl. ........................ 340/988; 324/171; 377/24.1; 701/207; 701/210
[58] Field of Search ........................ 340/988, 990, 340/995; 364/449.2, 449.4; 73/178 R; 235/95 R; 33/523.2; 324/171; 377/24.1; 701/207, 210

[56] References Cited

U.S. PATENT DOCUMENTS

| | | |
|---|---|---|
| 3,845,289 | 10/1974 | French . |
| 4,139,889 | 2/1979 | Ingels ............................ 340/995 |
| 4,570,227 | 2/1986 | Tachi et al. ..................... 340/990 |
| 4,608,656 | 8/1986 | Tanaka et al. ................... 340/995 |
| 4,611,293 | 9/1986 | Hatch et al. .................... 364/571 |
| 4,672,565 | 6/1987 | Kuno et al. ..................... 364/571 |
| 4,673,878 | 6/1987 | Tsushima et al. ................ 364/444 |
| 4,723,218 | 2/1988 | Hasebe et al. ................... 340/990 |
| 4,734,863 | 3/1988 | Honey et al. .................... 340/988 |
| 4,751,512 | 6/1988 | Longaker ........................ 342/357 |
| 4,782,447 | 11/1988 | Ueno et al. ...................... 364/521 |
| 4,796,191 | 1/1989 | Honey et al. .................... 364/450 |
| 4,797,841 | 1/1989 | Hatch ............................. 364/559 |
| 4,831,563 | 5/1989 | Ando et al. ....................... 364/457 |
| 4,862,398 | 8/1989 | Shimizu et al. ................... 364/457 |
| 4,903,212 | 2/1990 | Yokouchi et al. .................. 364/449.2 |
| 4,914,605 | 4/1990 | Loughmiller, Jr. et al. ........... 364/518 |
| 4,918,609 | 4/1990 | Yamawaki ........................ 342/357 |
| 4,926,336 | 5/1990 | Yamada ........................... 340/990 |
| 4,937,753 | 6/1990 | Yamada ........................... 340/990 |
| 4,964,052 | 10/1990 | Ohe ............................... 340/995 |
| 4,970,652 | 11/1990 | Nagashima ....................... 340/995 |
| 4,982,332 | 1/1991 | Saito et al. ....................... 340/995 |
| 4,984,168 | 1/1991 | Neukrichner et al. ............... 340/995 |
| 4,989,151 | 1/1991 | Nuimura .......................... 340/995 |
| 4,992,947 | 2/1991 | Nuimura et al. ................... 340/995 |
| 4,996,645 | 2/1991 | Van der Zon ..................... 340/995 |

(List continued on next page.)

FOREIGN PATENT DOCUMENTS

| | | | |
|---|---|---|---|
| 0527558 A1 | 2/1993 | European Pat. Off. | ......... G01S 5/02 |
| 0544403 A1 | 6/1993 | European Pat. Off. | ......... G02C 21/20 |
| 2107985 | 4/1990 | Japan | ................. G01S 5/02 |

OTHER PUBLICATIONS

R.L. French, "Map Matching Origins Approaches and Applications," Rober L. French & Associates, 3815 Lisbon St., Suite 201, Fort Worth, Texas 76107, USA, pp. 91–116.

Primary Examiner—Brent A. Swarthout
Attorney, Agent, or Firm—Joseph M. Villeneuve; Beyer & Weaver, LLP

[57] ABSTRACT

Method and apparatus for modifying an odometer reading in a vehicle navigation system to compensate for odometer errors. A first distance measurement is obtained from the odometer, and a second distance measurement is obtained from at least one other sensor. The difference between the first and second distance measurements is determined and an adjustment amount is generated in response thereto. A modification factor is then adjusted by the adjustment amount, the modification factor being for modifying the odometer reading. The odometer reading is then modified with the modification factor. A method and apparatus for selecting a pulse rate setting in a vehicle navigation system to correspond to a pulse rate associated with the odometer are also described. A first distance measurement is obtained from the odometer and a second distance measurement is obtained from at least one other sensor. The difference between the first and second distance measurements is then determined. The pulse rate setting is changed to correspond to the odometer pulse rate if the difference is greater than a threshold level, and is left unchanged if the difference is less than the threshold level.

22 Claims, 7 Drawing Sheets

U.S. PATENT DOCUMENTS

| | | | |
|---|---|---|---|
| 4,999,783 | 3/1991 | Tenmoku et al. | 364/460 |
| 5,040,122 | 8/1991 | Neukirchner et al. | 364/454 |
| 5,046,011 | 9/1991 | Kakihara et al. | 340/990 |
| 5,060,162 | 10/1991 | Ueyama et al. | 364/454 |
| 5,119,301 | 6/1992 | Shimizu et al. | 340/995 |
| 5,177,685 | 1/1993 | Davis et al. | 340/988 |
| 5,179,519 | 1/1993 | Adachi et al. | 364/449.2 |
| 5,220,509 | 6/1993 | Takemura et al. | 340/988 |
| 5,283,743 | 2/1994 | Odagawa | 364/457 |
| 5,287,297 | 2/1994 | Ihara et al. | 364/559 |
| 5,293,318 | 3/1994 | Fukushima | 340/995 |
| 5,297,050 | 3/1994 | Ichimura et al. | 340/989 |
| 5,323,152 | 6/1994 | Morita | 340/995 |
| 5,422,639 | 6/1995 | Kobayashi et al. | 340/995 |

METHOD AND APPARATUS FOR CALIBRATION OF A DISTANCE SENSOR IN A VEHICLE NAVIGATION SYSTEM

BACKGROUND OF THE INVENTION

The present invention relates generally to vehicle navigation systems. More specifically, the invention relates to methods and apparatus which provide periodic, on-the-fly calibration of readings from a vehicle's odometer sensor to ensure accurate determination of the vehicle's position by the navigation system.

Vehicle navigation systems have traditionally employed a variety of sensors to determine the position, speed, and heading of a vehicle. For example, global positioning system (GPS) sensors have been employed to detect signals from GPS satellites which are, in turn, employed by the navigation system to determine the position of a vehicle. On-board sensors such as magnetic compasses and gyroscopes have been employed to sense the vehicle's heading as well as the angular acceleration accompanying changes in the vehicle heading. For measuring distances traveled by a vehicle, navigation systems have traditionally employed the vehicle's odometer signal. It is evident that the accuracy of the data received from these various sensors is essential to the reliable determination of the vehicle's position.

The accuracy of data received from a vehicle's odometer is influenced by a number of factors. Because an odometer typically detects wheel revolutions as representative of travelled distance, the tire size is directly related to the accuracy of the reported travel distance. For current navigation systems, once the vehicle's tire size is known, it is manually programmed into the navigation system to properly correlate wheel revolutions to travelled distance. However, it is well known that the size of a vehicle's tires change over time as they wear down from contact with the road. Moreover, factors such as the air pressure of the tires and the weight loaded on the vehicle at any given time produce variation in travel distance reported by the odometer. The tire size may be periodically reprogrammed into the system to account for such variations, but this is obviously impractical in that a difficult manual reprogramming would frequently be required, possibly every time the navigation system is used.

Another potential source of error in measured distance reported by an odometer is a mismatch between the odometer's pulse rate and the pulse rate setting of the navigation system. Odometers generate a pulse train in which a specific number of pulses (e.g., 2000) represents a unit distance (e.g., a mile). For example, Nissan vehicles employ a pulse rate of 2000 pulses/mile while Ford vehicles employ a pulse rate of 8000 pulses/mile. Therefore, each navigation system must be configured to correspond to the type of vehicle in which it is installed. Otherwise very large scale errors may result. If, for example, the pulse rate setting in a navigation system installed in a Ford corresponded to the pulse rate of a Nissan, an error factor of four would be introduced. The pulse rate setting is typically done before a navigation system is installed and is difficult to change where, for example, the odometer in the vehicle is changed, or the navigation system is installed in a different vehicle. Thus, while detection of the error may be elementary, correction of the error remains problematic.

It is therefore apparent that there is a need for a convenient technique by which odometer measurements may be rendered reliable and accurate despite the many unpredictable variations encountered over the course of time. There is also a need for a technique to determine whether a navigation system's pulse rate setting corresponds to the pulse rate of the associated odometer, and to reset the pulse rate setting if it is found to be in error.

SUMMARY OF THE INVENTION

The present invention provides methods and apparatus which address the problems discussed above. Specifically, the present invention enables a vehicle navigation system to automatically compensate for odometer measurement errors due to changes in tire and road conditions as those changes occur. According to a specific embodiment of the invention, the odometer reading is modified by a modification factor which is periodically adjusted to reflect changing conditions. Initially, the modification factor may be set to correspond to the tire size. A travel distance is measured using data from the odometer and at least one other sensor, such as, for example, a GPS receiver. The difference between the measurements is calculated and an adjustment amount is generated by which the modification factor is adjusted. In specific embodiments, there is a maximum value limit for the adjustment amount which varies depending upon the number of times the modification factor has been adjusted. Similarly, in other specific embodiments, the number of distance data points used to measure the travel distances for this procedure varies depending upon the number of adjustments to the modification factor.

Several features are provided in various specific embodiments of the invention which verify the integrity of the data employed to obtain the various distance measurements used to calibrate the odometer. For example, if the difference between the distance measurement from the odometer and the distance measurement from the other sensor or sensors is greater than a threshold level, those distance measurements are discarded and new distance measurements using new data are obtained. Similarly, if the distance data employed to determine the distance measurements is determined to be unreliable, the distance measurements are discarded and new distance measurements are obtained. In another embodiment, different vehicle positions are determined based on the different distance measurements. It is then determined whether the relative relationship between the different positions is consistent with the current modification factor. For example, if the modification factor has been determined to be too large yet the position corresponding to the odometer is behind the position corresponding to the other sensor, the positions are determined to be inconsistent with the modification factor, i.e., the position of the odometer should be ahead of the other position if the modification factor has been determined to be too large. If the results are inconsistent, new distance measurements are obtained.

Thus, according to the invention, a method and apparatus for modifying an odometer reading in a vehicle navigation system to compensate for odometer errors are described. A first distance measurement is obtained from the odometer, and a second distance measurement is obtained from at least one other sensor. The difference between the first and second distance measurements is determined and an adjustment amount is generated in response thereto. A modification factor is then adjusted by the adjustment amount, the modification factor being for modifying the odometer reading. The odometer reading is then modified with the modification factor.

A method and apparatus for selecting a pulse rate setting in a vehicle navigation system to correspond to a pulse rate associated with the odometer are also described. The invention employs an additional sensor such as, for example, a GPS receiver to collect data corresponding to traveled distance in parallel with the odometer. The distances measured by the odometer and the sensor are compared, and if the difference between the two measurements is greater than some threshold (indicating a large error likely due to an incorrect pulse rate), the system changes its pulse rate setting to correspond to the pulse rate of the odometer. In specific embodiments, the correct pulse rate setting is determined by the relationship between the two measurements. For example, according to a specific embodiment, if the pulse rate setting currently employed by the vehicle navigation system is 8000 pulses/mile but the odometer registers only about one-quarter the distance registered using the GPS data, the system resets its pulse rate setting to 2000 pulses/mile. If, however, the distance between the measurements is below the threshold, the pulse rate setting remains unchanged.

Thus, according to the invention, a first distance measurement is obtained from the odometer and a second distance measurement is obtained from at least one other sensor. The difference between the first and second distance measurements is then determined. The pulse rate setting is changed to correspond to the odometer pulse rate if the difference is greater than a threshold level, and is left unchanged if the difference is less than the threshold level.

A further understanding of the nature and advantages of the present invention may be realized by reference to the remaining portions of the specification and the drawings.

DESCRIPTION OF THE PREFERRED EMBODIMENT

Figure 1:
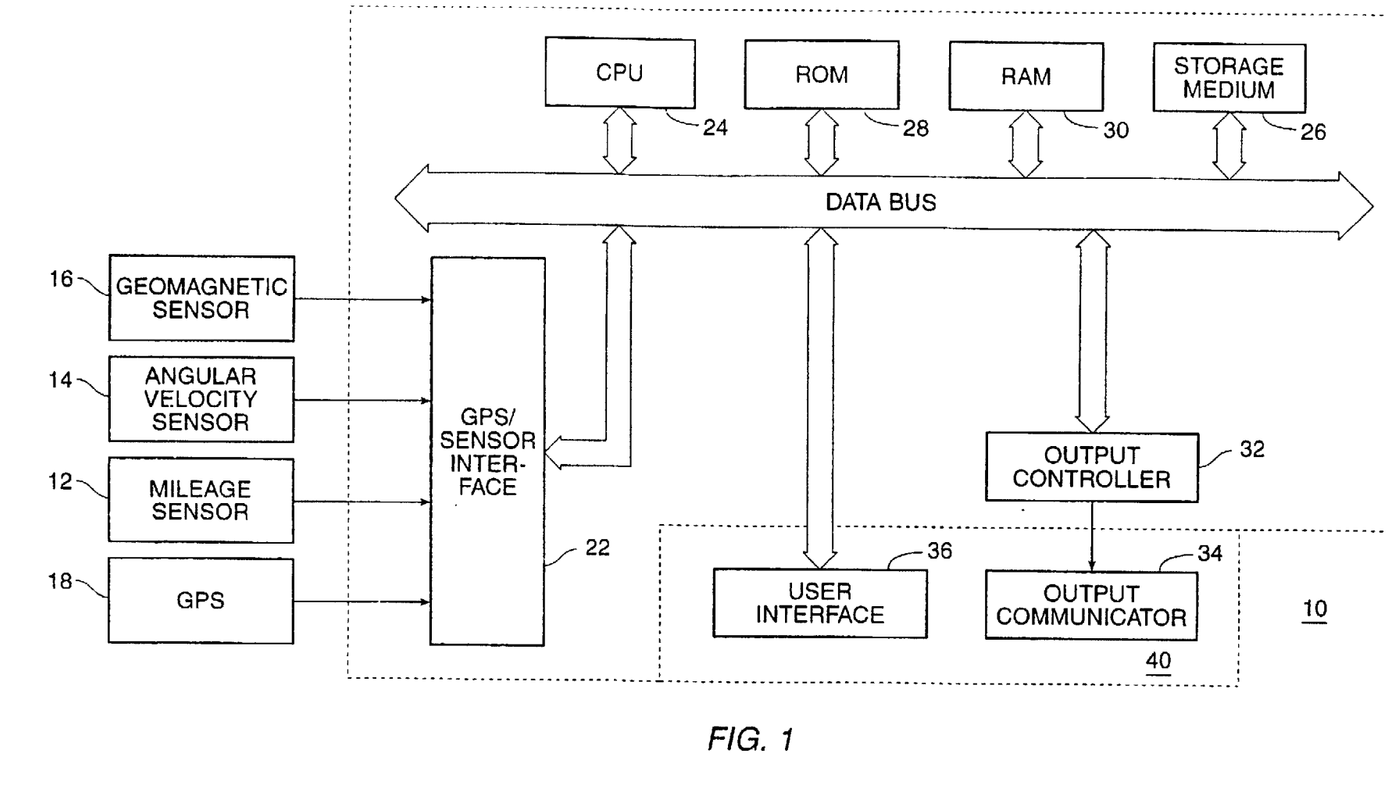
FIG. 1 is a block diagram of a vehicle navigation system for use with the present invention.

FIG. 1 is a block diagram of a vehicle navigation system 10 for use with the present invention. Sensors 12 to 16 and GPS receiver 18 are coupled to computing means 20 through sensor/GPS interface 22. In typical embodiments, the mileage sensor 12 comprises an odometer; the angular velocity sensor 14 comprises a gyroscope, or a differential odometer coupled to the wheels of the vehicle; and the geomagnetic sensor 16 usually comprises a magnetic compass mounted in the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A database containing map information may be stored in storage medium 26, with software directing the operation of computing means 20 stored in ROM 28 for execution by CPU 24. RAM 30 permits reading and writing of the information necessary to execute such software programs. Storage medium 26 may comprise a hard disk drive, CD-ROM or integrated circuit onto which digitized map information has been stored. Output controller 32, which may comprise a graphics controller, receives data processed by CPU 24 and transmits such data to output communicator 34, usually comprising a display screen. The user may input data, such as a desired destination, through user interface 36, typically comprising a keyboard.

The map database stored in storage medium 26 preferably comprises positional data such as, for example, latitude and longitude coordinates, to describe road intersections, road segments, landmarks and points of interest, and other geographical information. The data base may further comprise data representing characteristics of roads or places on the map, such as road and place names, road features such as dividers, one-way restrictions, surface, speed limit, shape, elevation, and other properties. Using the data stored in the map data base, the vehicle navigation system generates one or more possible positions of the vehicle by comparing the dead-reckoned position to the road segments, intersections, and other geographical locations stored in the data base. The system then filters the set of position possibilities and selects from the remaining position possibilities a position deemed to be the current position of the vehicle.

According to the present invention, after the vehicle navigation system is powered up and initialized, it first performs a pulse rate detection routine to determine whether the pulse rate setting of the navigation system corresponds to the pulse rate setting of the vehicle's odometer. Once the correct pulse rate setting is verified, the system performs a distance calibration routine which repeatedly applies a modification factor to the odometer reading to compensate for the factors affecting the odometer's accuracy described above. According to a specific embodiment of the invention, both the pulse rate detection routine and the distance calibration routine employ data from the vehicle's odometer and a GPS receiver. Specific embodiments of each of the routines will be discussed in turn.

In order for the pulse rate detection routine to operate, two conditions must be met. First, because the pulse rate detection routine relies on GPS data to determine a reference distance measurement, the reliability of this data is important and therefore the GPS signal reception must be stable. Second, the speed of the vehicle must be above a threshold speed to ensure the collection of trustworthy distance data from both the odometer and the GPS receiver. In a specific embodiment, GPS velocity data are used to determine whether this condition is met. In another specific embodiment, the threshold speed is 30 MPH. Data which are obtained while either of the conditions are not met are not used for the purpose of the adjustment.

Figure 2:
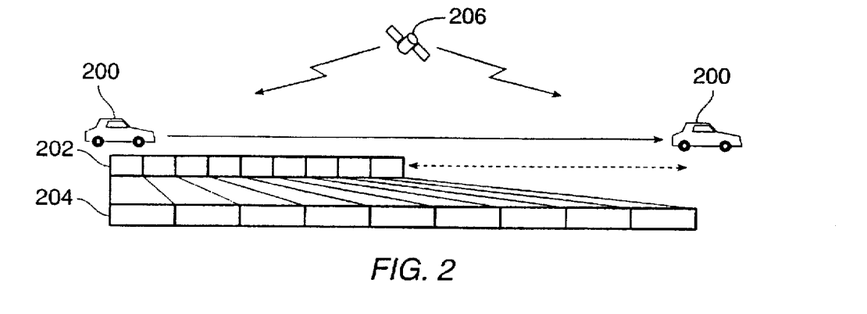
FIG. 2 is a diagram illustrating the operation of the pulse rate detection routine according to a specific embodiment of the invention.
Figure 3:
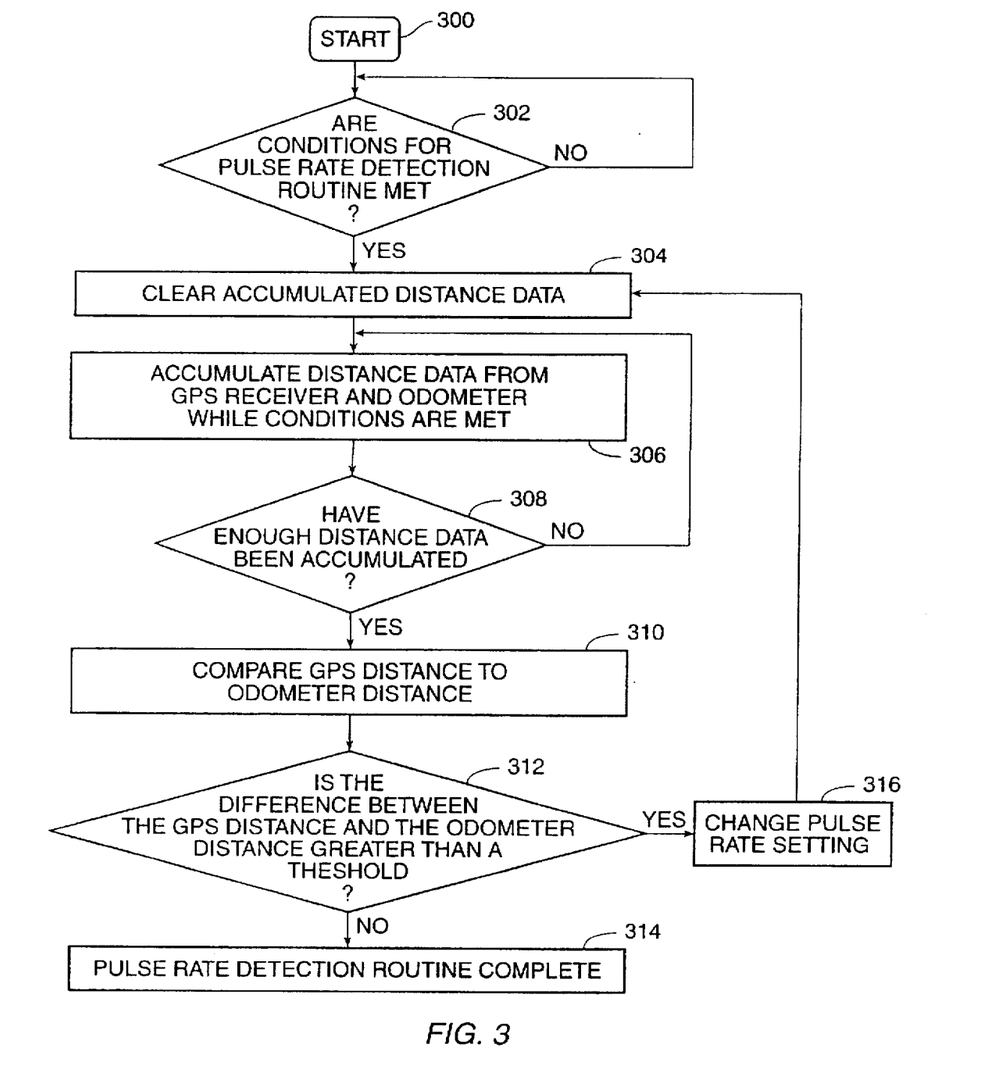
FIG. 3 is a flowchart illustrating the operation of the pulse rate detection routine according to a specific embodiment of the invention.

An example of the operation of the pulse rate detection routine is described with reference to the illustration of FIG. 2 and the flowchart of FIG. 3. In FIG. 2, the odometer of vehicle 200 has a pulse rate which is approximately half of the pulse rate setting of the navigation system. As discussed above, the accumulation of data from the odometer and the GPS receiver for the distance comparison begins when both GPS reception is stable and the vehicle speed is high enough (step 302). Once these conditions are met, any distance data are cleared (step 304) and the accumulation of distance data from the GPS receiver and the odometer begins (step 306). If either the GPS data becomes unstable or the vehicle slows below the speed threshold before the distance comparison is made, the accumulated distance data are cleared and the procedure begins again. Once a certain number of data points are accumulated (step 308), the distance 202 measured by the odometer is compared to the distance 204 measured using the GPS data from satellite 206 (step 310). If the difference between the two distances is greater than a threshold amount (step 312), the navigation system is instructed to change the pulse rate setting (step 316), the accumulated distance data is cleared, and the procedure is repeated until the pulse rate setting is verified as correct. If the difference between the two distances is below the threshold, pulse rate setting is assumed to be correct and the pulse rate detection routine ends (step 314).

Several conditions must also be met for the operation of the distance calibration routine. First, the pulse rate setting of the vehicle navigation system must be properly set, i.e., the pulse rate detection routine must be completed. Second, as with the pulse rate detection routine, the GPS reception must be stable and the vehicle speed must be maintained above a speed threshold. According to a specific embodiment, GPS velocity data are used to determine this condition. According to a more specific embodiment, a first speed threshold (e.g., 40 MPH) is employed for determining when to start or restart the distance calibration routine, and a lower second speed threshold (e.g., 35 MPH) is employed to determine when to pause operation of the routine, i.e., ignore incoming data.

Third, the velocities reported by the GPS velocity data and the odometer data must be close. If the difference is too large, this may be an indication that one or both sets of data may be either corrupted or erroneous. Therefore, if the difference is above a certain threshold, the incoming distance data are not used for the distance calibration routine.

Finally, in order for the distance calibration routine to make an adjustment to the modification factor (which is applied to the odometer reading), the adjustment must be consistent with the relationship between the current vehicle position as determined by the navigation system and the current vehicle position as determined using the GPS data. For example, if the GPS vehicle position is determined to be ahead of the navigation system's position estimate, then an increase in the modification factor would be consistent with this relationship while a decrease in the modification factor would not. The determination of consistency is described in more detail below.

The distance calibration routine has three operational states: DISABLED, RUNNING, and PAUSED. The DISABLED state is the initial state of the routine at system start-up. The routine remains in the DISABLED state until the first three conditions described above are met, i.e., until the pulse rate detection routine is completed, GPS reception is stable, and the first speed threshold is exceeded. Once the distance calibration routine is operating (i.e., in either the RUNNING or PAUSED states) it may return to the DISABLED state for a number of reasons. For example, the routine will return to the DISABLED state if GPS data is not available for more than a programmable time period. According to a specific embodiment, this time period is 20 seconds although it will be understood that this time period may be variable. In addition, the routine will return to the DISABLED state if the user manually changes the vehicle position reported by the navigation system. Finally, if the distance calibration routine has been performed more than a programmable number of times thus indicating that further calibration of the odometer reading is no longer required, the routine will return to this state.

Figure 4:
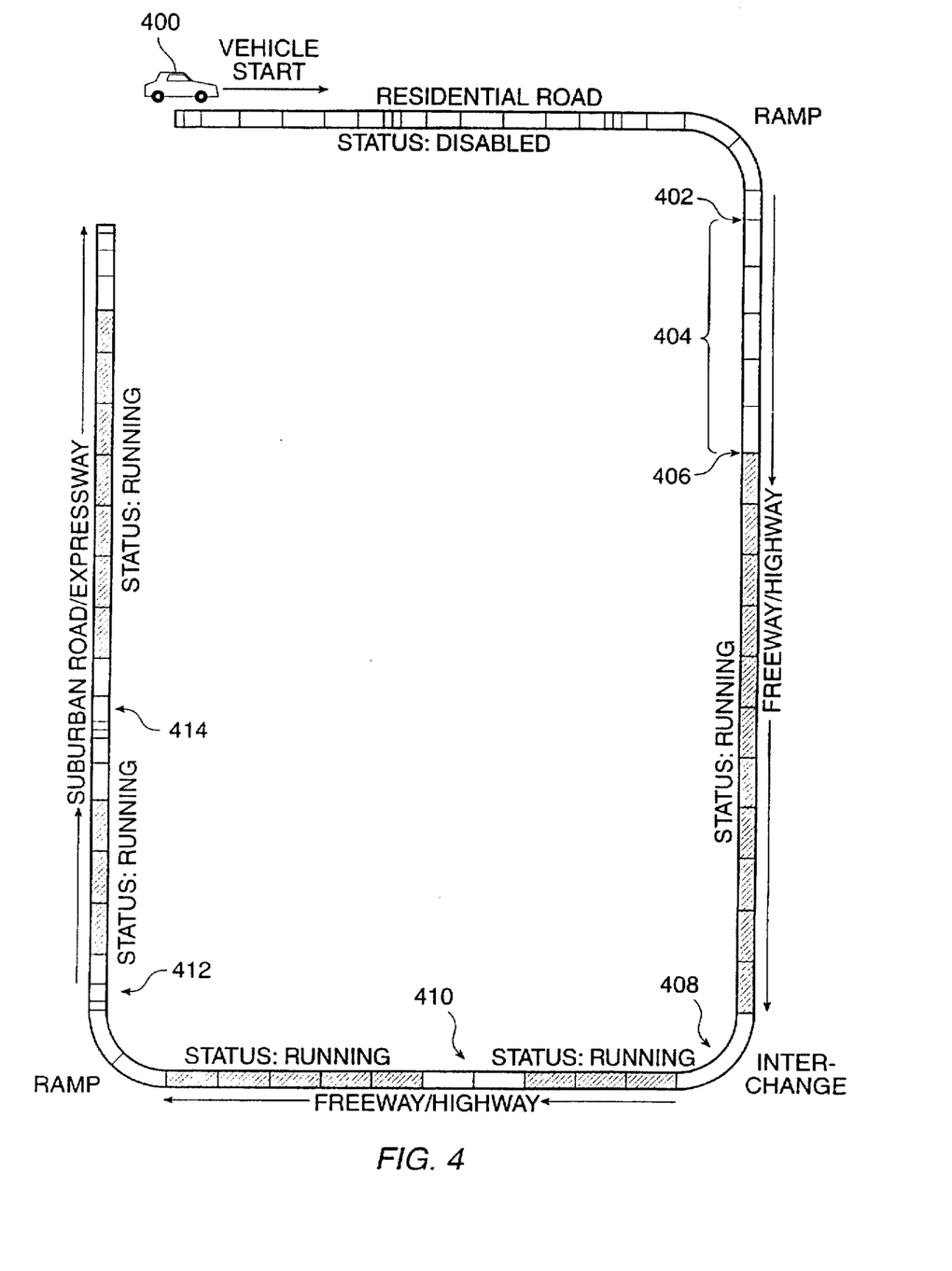
FIG. 4 is a diagram illustrating the various states of the distance calibration routine according to a specific embodiment of the invention.

The diagram of FIG. 4 illustrates the manner in which the distance calibration routine moves between the states described above. At system start-up vehicle 400 begins traveling along a residential road and as indicated, the status of the distance calibration routine is DISABLED. Upon accessing a freeway/highway, vehicle 400 exceeds the first speed threshold at 402 and maintains sufficient speed for a period of time 404. Assuming that GPS reception is stable, the routine's status becomes RUNNING and accumulation of distance data begins at 406. At 408, vehicle 400 negotiates an interchange and the routine status becomes PAUSED because of the potential unreliability of distance data accumulated during the maneuver. After the maneuver is completed, the status becomes RUNNING once again. At 410, the GPS signal is temporarily lost so the routine's status becomes PAUSED. At 412 and 414, vehicle 400 slows below the second speed threshold temporarily causing the routine to enter PAUSED status. As illustrated, the routine moves between the PAUSED and RUNNING status according to the status of the conditions discussed above.

Once the pulse rate detection routine is completed, GPS reception is stable and the vehicle speed is greater than the first speed threshold for a set period of time, the distance calibration routine enters the RUNNING state in which distance data are accumulated from the GPS receiver and the odometer for comparison as described below. If one or more of the conditions described above turns bad while in the RUNNING state, the routine enters the PAUSED state in which incoming distance data from the GPS receiver and the odometer are considered unreliable and are not used for the comparison. For example, if the vehicle runs slower than the second speed threshold while in the RUNNING state, the routine enters the PAUSED state. If the vehicle speed subsequently exceeds the first speed threshold (and GPS reception is stable) the state of the distance calibration routine may change from PAUSED to RUNNING. Similarly, if a large velocity difference is observed between the GPS data and the odometer data, the routine will change from the RUNNING state to the PAUSED state.

Figure 5A:
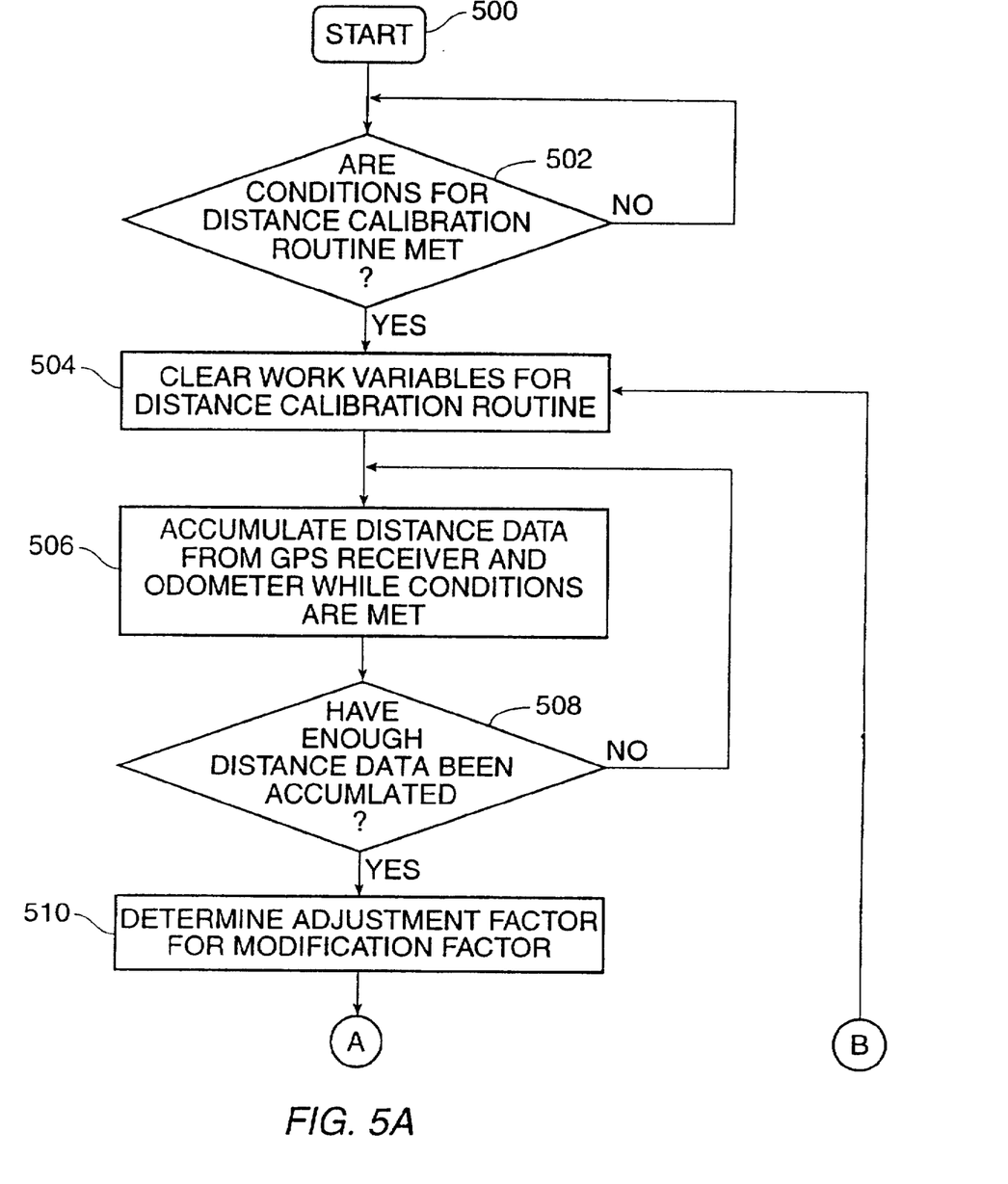
FIG. 5 is a flowchart illustrating the operation of the distance calibration routine according to a specific embodiment of the invention.
Figure 5B:
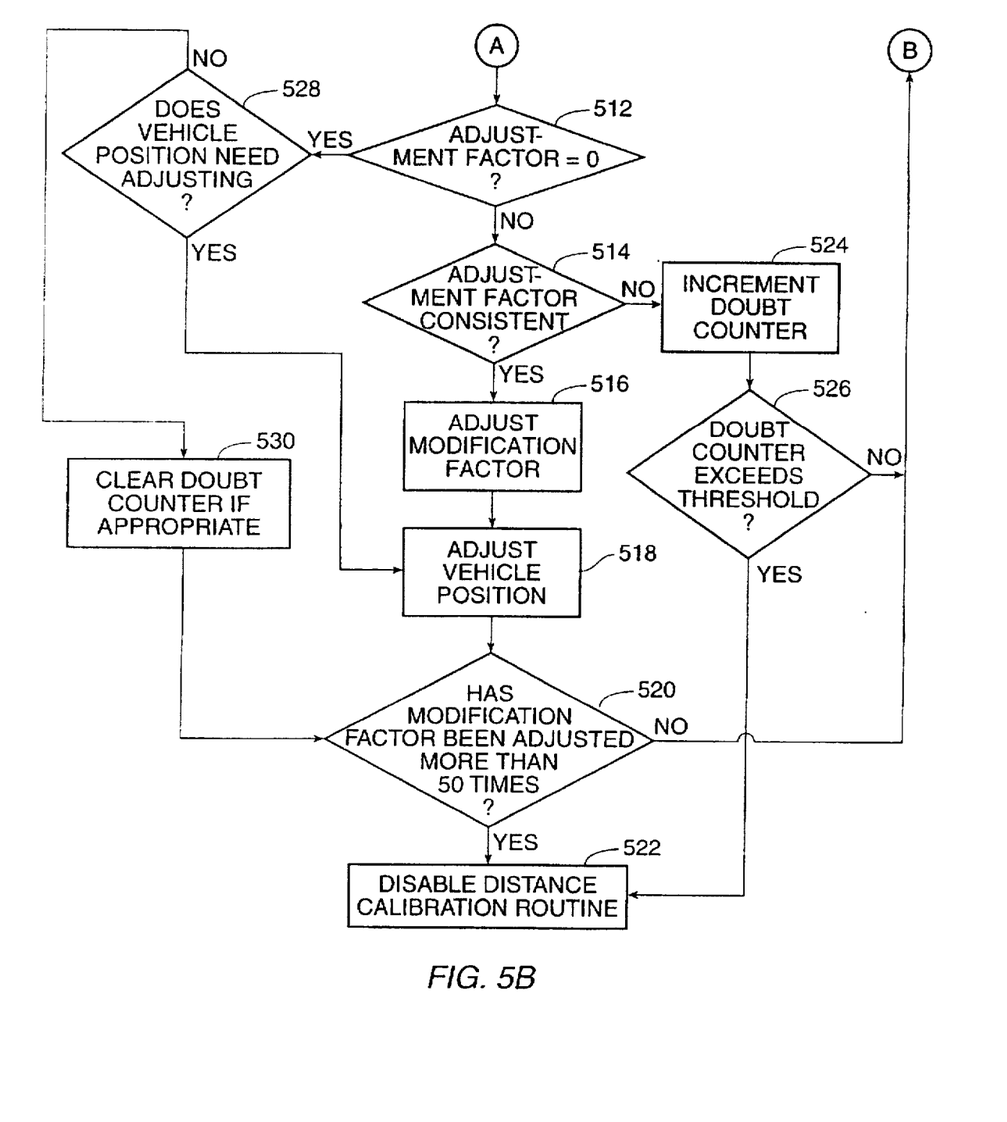

FIG. 5 is a flowchart illustrating the operation of the distance calibration routine according to a specific embodiment of the invention. As discussed above, it is first determined whether the pulse rate detection routine has been completed, GPS reception is stable and the vehicle speed is greater than a first speed threshold for a set period of time (step 502) before the work variables employed by the distance calibration routine are cleared and the routine is enabled (step 504). While the conditions discussed above continue to be met, distance data are collected from the GPS receiver and the odometer (step 506). When enough data have been collected (step 508), an adjustment factor is determined for application to a modification factor which is, in turn, applied to the odometer reading (step 510). According to a specific embodiment, the number of data which are considered sufficient for the determination of the adjustment factor may vary depending upon the number of times the distance calibration routine has been executed. For example, the first time the routine is executed, 300 data points from the odometer might be required. Each time thereafter until the tenth execution of the routine might require 100 data points from the odometer. Beginning at the tenth execution of the routine, only 50 data points might be required. It will be understood that many different such schemes may be employed.

The modification factor is applied to the distance data from the odometer to compensate for the variations in vehicle conditions discussed in the Background of the Invention. In a specific embodiment, the modification factor ranges between −10% and +10% in increments of 0.1%. The adjustment factor determined in step 510 is the value by which the modification factor must be changed so that the distance data reported by the odometer more closely approximate the actual traveled distance. The adjustment factor is determined through a comparison of traveled distances reported by the GPS receiver and the odometer. According to a specific embodiment, the difference between the distances as reported by the two different sensors is converted to a percentage which then becomes the adjustment factor. As will be discussed, the percentage may be reduced depending upon a number of conditions. In any case, if the comparison of the two reported distances shows that the current modification factor is not sufficient the modification factor is adjusted by the adjustment factor to bring the two distances more in line with one another.

According to a specific embodiment, the amount by which the modification factor may be adjusted varies according to the number of times the modification factor has previously been adjusted. In other words, a limit is placed on the adjustment factor which is dependent upon the number of times the distance calibration routine has been executed. This limit decreases as the number of adjustments increases. For example, if the modification factor had not previously been adjusted, the limit on the adjustment factor might be set at ±2.0%. If the modification factor had previously been adjusted once or twice, the limit might be reduced to ±0.3%. Finally, after ten adjustments, the maximum allowable adjustment might be set at the minimum increment ±0.1% for each adjustment thereafter. In this way, the effect of temporary conditions which cause the distance data to fluctuate dramatically may be diminished.

If the adjustment factor is determined to be nonzero (step 512), it is then determined whether the adjustment factor is consistent with the relationship between the vehicle's position derived from the GPS data (the GPS position) and the vehicle's position derived from the odometer data (the dead-reckoned position). This may best be understood with reference to FIG. 6. In the case where the modification factor is determined to be too small, the distance calibration routine generates a positive adjustment factor, i.e., an increase to the modification factor. A positive adjustment factor is consistent with the relationship between the dead-reckoned position 600 and a GPS position which lies ahead of position 600 and within region 602 (e.g., position 604). That is, in order to cause position 600 to more closely coincide with position 604, it follows that the factor modifying the odometer data must be increased.

Figure 6:
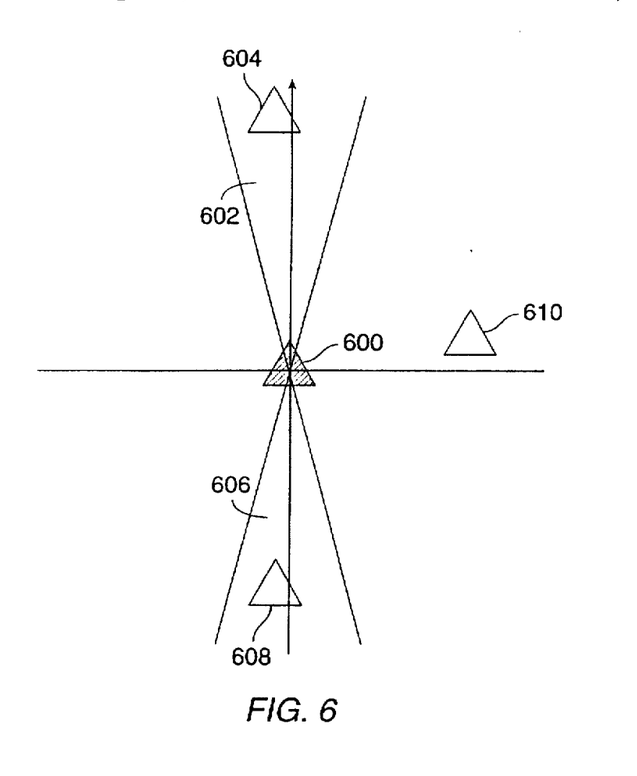
FIG. 6 is a diagram illustrating the determination of the consistency of an adjustment factor.

Similarly, in the case where the modification factor is determined to be too large, the distance calibration routine generates a negative adjustment factor, i.e., a decrease to the modification factor. A negative adjustment factor is consistent with a GPS position which lies behind dead-reckoned position 600 and within region 606 (e.g., position 608).

Conversely, a negative adjustment factor would not be consistent with GPS position 604, nor would a positive adjustment factor be consistent with GPS position 608. For GPS reported positions lying outside regions 602 and 606 (i.e., position 610), no adjustment to the modification factor is made.

Referring again to FIG. 5, when the adjustment factor has been found to be consistent, the modification factor is then adjusted using the adjustment factor (step 516). The distance calibration routine then employs the new modification factor to adjust the vehicle position reported by the navigation system (step 518). According to a specific embodiment, this adjustment is performed gradually so that the vehicle position does not appear to the user to be jumping around the screen. The routine then determines whether the modification factor has been adjusted more than some threshold number of times, e.g., 50 times (step 520). If the threshold has been exceeded, it is assumed that the modification factor has been appropriately set and the distance calibration routine is disabled. If the threshold has not been exceeded, the work variables are cleared (step 504) and the routine is repeated.

Figure 7:
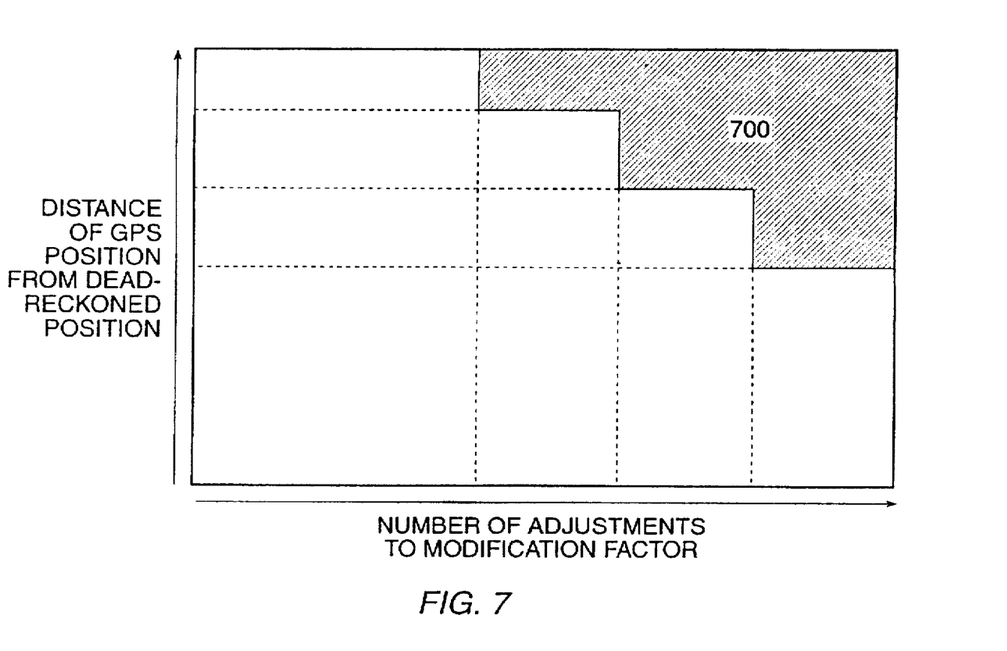
FIG. 7 is a diagram illustrating the conditions under which the vehicle position is adjusted.

If, in step 512, the adjustment factor is determined to be zero, the routine then determines whether the vehicle position nevertheless needs adjusting (step 528). In making this determination, the distance calibration routine takes into account the difference between the GPS and dead-reckoned positions and the number of times the modification factor has been previously adjusted. The likelihood that the routine will determine that the vehicle position should be adjusted increases as both of these factors increase. That is, an adjustment of the dead-reckoned position is more likely if the GPS position and the dead-reckoned position are far apart and the modification factor has been adjusted many times. Put another way, the dead-reckoned position is adjusted if the GPS position is beyond a circular region centered on the current dead-reckoned position. The radius of this circular region becomes smaller as the number of adjustments to the modification factor increases. This may be understood with reference to FIG. 7. Adjustments to the vehicle position are performed when the condition is in region 700. Once it is determined that the vehicle position should be adjusted, the routine proceeds to step 518. If no adjustment is to be made to the vehicle position, the routine proceeds instead to step 520 by way of step 530 which is discussed below.

Figure 8:
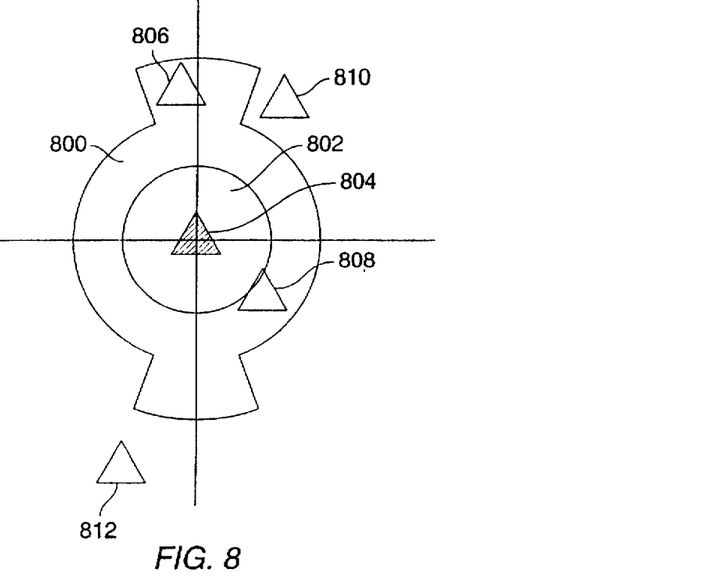
FIG. 8 is a diagram illustrating the conditions under which the doubt counter is cleared.

If in step 514, the adjustment factor is found to be inconsistent with the relationship between the GPS and dead-reckoned positions, a doubt counter is incremented (step 524) and a determination is made as to whether the doubt counter has exceeded a threshold value (step 526). If the doubt counter has not exceeded the threshold, the work variables are cleared once again (step 504) and the routine is repeated. If, however, the doubt counter has exceeded the threshold, the distance calibration routine is disabled (step 522). The doubt counter allows the routine to be aborted if it consistently generates adjustment factors which are not valid. When the adjustment factor is determined to be zero (step 512) and the vehicle position does not need to be adjusted (step 528), the doubt counter is cleared if the GPS position is within the region around the dead-reckoned position as shown in FIG. 8 (step 530). Region 800 is determined with reference to a minimum distance region 802 within which the GPS position and the dead-reckoned position 804 are considered the same. Region 800 has a radius of twice that of region 802 except directly in front of or behind dead-reckoned position 804 where the radius is three times that of region 802. Thus, for GPS positions 806 and 808, the doubt counter would be cleared, but for GPS positions 810 and 812, the routine would proceed to step 520 without clearing the counter.

Figure 9:
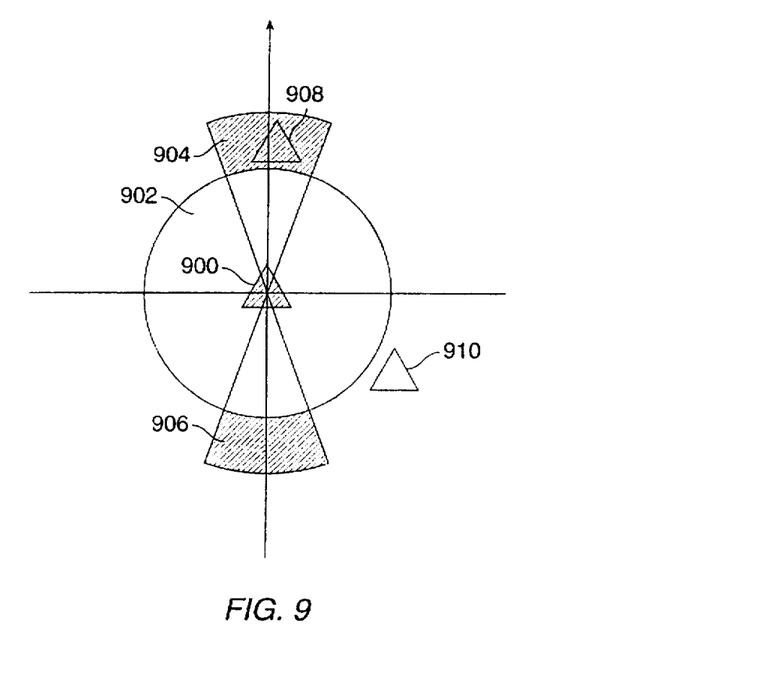
FIG. 9 is a diagram illustrating the "Big Error" condition.

According to a specific embodiment of the invention, the distance calibration routine also keeps track of large differences between the GPS position and the dead-reckoned position. The routine maintains a "Big Error" counter which is incremented each time the GPS position is determined to be beyond a maximum allowable distance either in front of or behind the dead-reckoned position. As shown in FIG. 9, dead-reckoned position 900 is at the center of a circle 902 having a radius equal to the maximum allowable distance. If a GPS position is reported in either of shaded regions 904 and 906 (e.g., GPS position 908) the "Big Error" counter is incremented. For any GPS positions reported outside of these regions (e.g., GPS position 910) the "Big Error" counter is decremented. When the "Big Error" counter exceeds a limit (5 in a specific embodiment) a "Big Error" condition flag is set which indicates that a GPS data update is required.

While the invention has been particularly shown and described with reference to specific embodiments thereof, it will be understood by those skilled in the art that the foregoing and other changes in the form and details may be made therein without departing from the spirit or scope of the invention.

What is claimed is:

1. A method for modifying an odometer reading in a vehicle navigation system to compensate for odometer errors, the method comprising the steps of:

obtaining a first distance measurement from the odometer;

obtaining a second distance measurement from at least one other sensor;

determining a first difference between the first and second distance measurements;

generating an adjustment amount in response to the determining step; and adjusting a modification factor by the adjustment amount, the modification factor being for modifying the odometer reading;

modifying the odometer reading with the modification factor; and repeating the obtaining steps before generating the adjustment amount if the first difference is greater than a threshold level.

2. A method for modifying an odometer reading in a vehicle navigation system to compensate for odometer errors, the method comprising the steps of:

obtaining a first distance measurement from the odometer;

obtaining a second distance measurement from at least one other sensor;

determining a first difference between the first and second distance measurements;

generating an adjustment amount in response to the determining step; and adjusting a modification factor by the adjustment amount, the modification factor being for modifying the odometer reading; and modifying the odometer reading with the modification factor;

wherein a maximum value limit is placed on the adjustment amount and wherein the generating step comprises setting the maximum value limit to one of a plurality of levels, each of the plurality of levels corresponding to the number of repetitions of the adjusting step.

3. A method for modifying an odometer reading in a vehicle navigation system to compensate for odometer errors, the method comprising the steps of:

obtaining a first distance measurement from the odometer;

obtaining a second distance measurement from at least one other sensor;

determining a first difference between the first and second distance measurements;

generating an adjustment amount in response to the determining step; and adjusting a modification factor by the adjustment amount, the modification factor being for modifying the odometer reading; and modifying the odometer reading with the modification factor;

wherein the obtaining, determining, generating, adjusting, and modifying steps are repeated a plurality of times, and wherein the obtaining steps employ a first number of distance data points to obtain the first and second distance measurements, the first number varying according to the number of repetitions of the adjusting step.

4. A method for modifying an odometer reading in a vehicle navigation system to compensate for odometer errors, wherein the odometer has a pulse rate associated therewith and the vehicle navigation system has a pulse rate setting associated therewith, the method comprising the steps of:

obtaining a first distance measurement from the odometer;

obtaining a second distance measurement from at least one other sensor;

determining a first difference between the first and second distance measurements;

generating an adjustment amount in response to the determining step; and adjusting a modification factor by the adjustment amount, the modification factor being for modifying the odometer reading;

modifying the odometer reading with the modification factor;

obtaining a third distance measurement from the odometer;

obtaining a fourth distance measurement from the at least one other sensor;

determining a second difference between the third and fourth distance measurements;

changing the pulse rate setting to correspond to the pulse rate if the second difference is greater than or equal to a threshold level; and proceeding to the adjusting step if the second difference is less than the threshold level.

5. The method of claim 4 wherein the at least one other sensor comprises a global positioning satellite (GPS) sensor which receives a GPS signal.

6. The method of claim 5 further comprising the steps of:

determining whether reception of the GPS signal is stable for the third and fourth obtaining steps;

proceeding to the step of determining a second difference if the reception of the GPS signal is determined to be stable during the third and fourth obtaining steps; and repeating the third and fourth obtaining steps if the reception of the GPS signal is determined to be unstable during the third and fourth obtaining steps.

7. The method of claim 5 further comprising the steps of:

determining a vehicle speed using the GPS signal;

proceeding to the step of determining a second difference if the vehicle speed is determined to be greater than or equal to a threshold level; and repeating the third and fourth obtaining steps if the vehicle speed is determined to be less than the threshold level.

8. A method for modifying an odometer reading in a vehicle navigation system to compensate for odometer errors, wherein the odometer has a pulse rate associated therewith and the vehicle navigation system has a pulse rate setting associated therewith, the method comprising the steps of:

obtaining a first distance measurement from the odometer;

obtaining a second distance measurement from at least one other sensor;

determining a first difference between the first and second distance measurements;

changing the pulse rate setting to correspond to the pulse rate if the first difference is greater than or equal to a threshold level;

obtaining a third distance measurement from the odometer;

obtaining a fourth distance measurement from the at least one other sensor;

determining a second difference between the third and fourth distance measurements;

generating an adjustment amount in response to the step of determining a second difference;

adjusting a modification factor by the adjustment amount, the modification factor being for modifying the odometer reading;

modifying the odometer reading with the modification factor thereby generating a modified odometer reading;

repeating the third and fourth obtaining steps, the second determining step, the generating step, the adjusting step, and the modifying step a plurality of times.

9. The method of claim 8 wherein the at least one other sensor comprises a global positioning satellite (GPS) sensor which receives a GPS signal.

10. The method of claim 9 further comprising the steps of:

determining whether reception of the GPS signal is stable for the first and second obtaining steps;

proceeding to the step of determining a first difference if the reception of the GPS signal is determined to be stable during the first and second obtaining steps; and repeating the first and second obtaining steps if the reception of the GPS signal is determined to be unstable during the first and second obtaining steps.

11. The method of claim 9 further comprising the steps of:

determining a vehicle speed using the GPS signal;

proceeding to the step of determining a first difference if the vehicle speed is determined to be greater than or equal to a threshold level; and repeating the first and second obtaining steps if the vehicle speed is determined to be less than the threshold level.

12. The method of claim 9 further comprising the steps of:

determining whether reception of the GPS signal is stable for the third and fourth obtaining steps;

proceeding to the adjusting step if the reception of the GPS signal is determined to be stable during the third and fourth obtaining steps; and repeating the third and fourth obtaining steps if the reception of the GPS signal is determined to be unstable during the third and fourth obtaining steps.

13. The method of claim 9 further comprising the steps of:

determining a vehicle speed using the GPS signal;

proceeding to the adjusting step if the vehicle speed is determined to be greater than or equal to a threshold level; and repeating the third and fourth obtaining steps if the vehicle speed is determined to be less than the threshold level.

14. The method of claim 8 wherein a maximum value limit is placed on the adjustment amount and wherein the generating step comprises setting the maximum value limit to one of a plurality of levels, each of the plurality of levels corresponding to a number of repetitions of the adjusting step.

15. The method of claim 8 wherein the third and fourth obtaining steps employ a first number of distance data points to obtain the third and fourth distance measurements, the first number varying according to the number of repetitions of the adjusting step.

16. The method of claim 8 further comprising the steps of:

determining a first vehicle position based on the third distance measurement;

determining a second vehicle position based on the fourth distance measurement, the second vehicle position having a relative relationship with the first vehicle position;

determining whether the relative relationship is consistent with the modification factor;

proceeding to the adjusting step if the relative relationship is consistent with the modification factor; and repeating the third and fourth obtaining steps if the relative relationship is inconsistent with the modification factor.

17. A method for selecting a pulse rate setting in a vehicle navigation system to correspond to a pulse rate associated with an odometer, comprising the steps of:

obtaining a first distance measurement from the odometer;

obtaining a second distance measurement from at least one other sensor;

determining a difference between the first and second distance measurements;

changing the pulse rate setting to correspond to the pulse rate if the difference is greater than or equal to a threshold level; and leaving the pulse rate setting unchanged if the difference is less than the threshold level.

18. The method of claim 17 wherein the at least one other sensor comprises a global positioning satellite (GPS) sensor which receives a GPS signal.

19. The method of claim 18 further comprising the steps of:

determining whether reception of the GPS signal is stable for the obtaining steps;

proceeding to the step of determining a difference if the reception of the GPS signal is determined to be stable during the obtaining steps; and repeating the obtaining steps if the reception of the GPS signal is determined to be unstable during the obtaining steps.

20. The method of claim 18 further comprising the steps of:

determining a vehicle speed using the GPS signal;

proceeding to the step of determining a difference if the vehicle speed is determined to be greater than or equal to a threshold level; and repeating the obtaining steps if the vehicle speed is determined to be less than the threshold level.

21. A vehicle navigation system operable to select a pulse rate setting to correspond to a pulse rate associated with an odometer comprising:

an odometer;

at least one other sensor;

means for determining a difference between a first distance measurement from the odometer and a second distance measurement from the at least one other sensor; and means for changing the pulse rate setting to correspond to the pulse rate if the difference is greater than or equal to a threshold level, and for leaving the pulse rate setting unchanged if the difference is less than the threshold level.

22. A method for selecting a pulse rate setting to correspond to a pulse rate associated with an odometer in a vehicle navigation system, the method comprising:

determining a difference between a first distance measurement from the odometer and a second distance measurement from at least one other sensor; and changing the pulse rate setting to correspond to the pulse rate if the difference is greater than or equal to a threshold level, and for leaving the pulse rate setting unchanged if the difference is less than the threshold level.

* * * * *